US012756482B2

(12) United States Patent
Guo et al.

(10) Patent No.: US 12,756,482 B2
(45) Date of Patent: Oct. 6, 2026

(54) METHODS AND APPARATUSES PROVIDING OPTICAL BEAMFORMING CROSSBAR ARRAYS FOR RADIO COMMUNICATIONS

(71) Applicant: HUAWEI TECHNOLOGIES CO., LTD., Shenzhen (CN)

(72) Inventors: Yuhao Guo, Kanata (CA); Enxiao Luan, Kanata (CA); Mahsa Salmani, Kanata (CA); Mitchell Nichols, Kanata (CA); Armaghan Eshaghi, Kanata (CA); Zenghui Gu, Kanata (CA); Fei Duan, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 18/897,825

(22) Filed: Sep. 26, 2024

(65) Prior Publication Data

US 2025/0023645 A1 Jan. 16, 2025

Related U.S. Application Data

(63) Continuation of application No. PCT/CN2022/092100, filed on May 11, 2022.

(51) Int. Cl.

| | |
|---|---|
| ***H04B 10/80*** | (2013.01) |
| ***H01Q 3/26*** | (2006.01) |
| ***H04B 7/06*** | (2006.01) |
| ***H04B 10/2575*** | (2013.01) |

(52) U.S. Cl.

CPC ........... *H04B 10/80* (2013.01); *H04B 7/0617* (2013.01); *H01Q 3/2676* (2013.01); *H04B 10/2575* (2013.01); *H04B 2210/006* (2013.01)

(58) Field of Classification Search

None

See application file for complete search history.

(56) References Cited

U.S. PATENT DOCUMENTS

| | | | | |
|---|---|---|---|---|
| 5,933,113 | A * | 8/1999 | Newberg | H01Q 25/00 342/368 |
| 10,224,628 | B2 | 3/2019 | Vidal Drummond et al. | |
| 11,211,701 | B2 * | 12/2021 | Feng | H04N 23/56 |
| 11,374,654 | B2 * | 6/2022 | Morton | H04B 10/25759 |
| 11,394,116 | B2 * | 7/2022 | Gleason | G01S 7/032 |
| 11,454,859 | B1 * | 9/2022 | Cho | G02F 1/2955 |

(Continued)

OTHER PUBLICATIONS

M. Giordani, et al., "A Tutorial on Beam Management for 3GPP NR at mmWave Frequencies", in IEEE Communications Surveys & Tutorials, vol. 21, No. 1, pp. 173-196, Firstquarter 2019.

(Continued)

*Primary Examiner* — Jai M Lee

(57) ABSTRACT

A photonic apparatus for use in radiofrequency beamforming, with support for multiple users, is provided. An optical crossbar array is coupled to a transmit or receive antenna array. Controllable devices such as attenuators or switches operate to produce complex-weighted versions of optical input signals, and the complex weightings are generated in support of beamforming operations. Delay elements can also be provided to compensate for synchronization losses due to different optical path lengths in the array.

20 Claims, 9 Drawing Sheets

(56) References Cited

U.S. PATENT DOCUMENTS 12,298,442 B2 * 5/2025 Chan .................... G01S 7/4917
2025/0233303 A1 * 7/2025 Murakowski ...... H01Q 21/0075

OTHER PUBLICATIONS

A. F. Molisch, et al., "Hybrid Beamforming for Massive MIMO: A Survey", IEEE Communications Magazine, vol. 55, No. 9, pp. 134-141, 2017.

F. Sohrabi, et al., "Hybrid Digital and Analog Beamforming Design for Large-Scale Antenna Arrays", in IEEE Journal of Selected Topics in Signal Processing, vol. 10, No. 3, pp. 501-513, Apr. 2016.

J. Anzalchi, et al., "Optical Beamforming Based on Microwave Photonic Signal Processing", Proc. SPIE 10562, International Conference on Space Optics—ICSO 2016, Oct. 18-21, 2016.

S. Mondal, et al., "A 25-30 GHz Fully-Connected Hybrid Beamforming Receiver for MIMO Communication", IEEE Journal of Solid-State Circuits, vol. 53, No. 5, pp. 1275-1287, May 2018.

C. Zhu, et al., "Silicon Integrated Microwave Photonic Beamformer", Optica, vol. 7, No. 9, pp. 1162-1170, Sep. 2020.

F. Sohrabi et al., "Hybrid Beamforming with Finite-Resolution Phase Shifters for Large-Scale MIMO Systems", IEEE 16th International Workshop on Signal Processing Advances in Wireless Communications (SPAWC), pp. 136-140, 2015.

* cited by examiner

METHODS AND APPARATUSES PROVIDING OPTICAL BEAMFORMING CROSSBAR ARRAYS FOR RADIO COMMUNICATIONS

CROSS-REFERENCE TO RELATED APPLICATIONS

This application is a continuation of International Patent Application No. PCT/CN2022/092100, filed May 11, 2022, entitled "METHODS AND APPARATUSES PROVIDING OPTICAL BEAMFORMING CROSSBAR ARRAYS FOR RADIO COMMUNICATIONS" the contents of which are incorporated herein by reference in its entirety.

TECHNICAL FIELD

The present disclosure pertains in general to the field of radio communications, and in particular to optical devices used to facilitate antenna array beamforming for radio transmission, reception, or both.

BACKGROUND

Wireless communications systems, such as $5^{th}$ Generation (5G) and $6^{th}$ Generation (6G) networks are intended to provide very high data rates (e.g. 1 Gbps or more), very low latency (e.g. less than 1 ms), ultra-high reliability, and low energy consumption. Millimeter-wave (mmWave) communication (above 10 GHZ) is expected to be one of the key enablers of 5G systems so that the 5G and beyond systems can meet the aforementioned stringent requirements. Operating at mmWave frequencies potentially offers much higher bandwidth, and orders of magnitude higher data rate. Moreover, based on the shorter wavelength of mmWave signals, large numbers of antenna elements can be deployed in a relatively small area, which naturally leads to the use of a multiple-input multiple-output (MIMO) concept for mmWave communications. MIMO systems can potentially resolve relatively poor propagation characteristics of mmWave channels such as increased path loss and severe channel intermittency by employing beamforming techniques.

Beamforming can be viewed as a spatial signal processing technique that focuses the transmitted or received signal power of an antenna array to create a directional link between devices (e.g. between a base station and a user equipment device). A simple, idealized single antenna tends to radiate signals in all directions. Using multiple antenna elements, it is possible to focus signals in a specific direction, in order to form targeted beams of electromagnetic energy. The overlapping waves caused by the multiple antenna elements will produce interference that in some areas is constructive and in other areas is destructive. If executed correctly, this beamforming process can focus the signal according to a desired pattern.

In a simple scenario with a single wireless transmission path, multiple radiating elements can transmit the same signal at an identical wavelength but with different phases (and possibly different amplitudes) such that the strength of the combined received signal at a specific direction is enhanced. By focusing a signal in a specific direction, beamforming allows delivering higher signal quality to the receiver which means faster information transfer and fewer errors without needing to boost broadcast power. As more antennas are used, the beam can be better focused.

Three architectures for mmWave beamforming are analog beamforming, hybrid beamforming, and digital beamforming.

Analog beamforming is implemented by a phased array with a single RF chain driven by a digital-to-analog converter (DAC) in the transmitter or an analog-to-digital converter (ADC) in the receiver. The antenna weights in the phased array are typically constrained to be phase shifts that can be controlled using analog components. The phases of the phase shifters are typically quantized to limited resolution, and can be dynamically adjusted based on specific strategies to steer the beam. A drawback of analog beamforming is that typically only one data stream can be supported at a time. The architecture has low power consumption, but high insertion loss with many antennas due to the number of signal divisions.

In digital beamforming, one RF chain is allocated to each antenna, which makes digital beamforming more flexible than analog beamforming in terms of signal processing. The required phase shifting and weighting of the antenna signals are performed in a digital signal processing (DSP) unit. Digital beamforming can support higher number of data streams as compared to the analog beamforming architecture. However, the electronic components in each RF chain have potentially large power consumption, and the signal processing required in digital beamforming architectures is of high complexity.

Hybrid beamforming has been proposed to partially address the challenges in both analog and digital beamforming architectures. This architecture can be a two-stage beamforming architecture which is constructed by concatenation of a low-dimensional digital (baseband) beamformer and an RF (analog) beamformer implemented using phase shifters. Hybrid beamforming architectures are used in multi-user massive MIMO systems as they offer concurrent support of multiple data streams at a lower cost and complexity over digital beamformers. In a fully-connected hybrid beamforming architecture, the output of each of the RF chains is connected to all the antenna elements. Hybrid beamforming architectures that are not fully-connected are partially-connected, with the output of each of the RF chains only being connected to some of the antenna elements. Although hybrid beamforming can provide advantages over each of the digital and analog beamforming architectures, in electronic implementations, the analog portion of a hybrid beamformer suffers from insertion losses and transmission line losses that increase with the number of antenna elements due to the number divisions in the signal path and the length of the transmission lines. This requires embedded amplifiers in the beamforming network (BFN) to maintain signal powers at a useable level.

A solution to some of the challenges of the electronic-based beamforming architectures mentioned above is to utilize photonics-based beamforming techniques, which incorporate RF/optical and optical/RF converters at the beamformer interfaces with the beamforming carried out exploiting optical technology. The optical technology can be embodied in integrated circuits and can potentially result in beamformers of small size, low weight, low insertion loss, and with potentially low production and installation costs. Generally, RF photonic signal processing techniques for beamforming applications can offer significant performance benefits over electronic approaches due to tunability, high bandwidth, and compact form factor of optical components. Moreover, photonic circuits are immune to electromagnetic interference and have lower propagation losses in silicon waveguides.

However, to date, photonics-based beamforming solutions have been subject to various problems for example in terms of power consumption, insertion loss, and scalability. A further issue is that such solutions tend to not be readily extendable to support multiple data streams, which is important in future communication networks expected to support large numbers of users. Furthermore, some prior solutions rely on true optical time delay lines which have relatively large footprints.

Therefore, there is a need for an optical beamforming system that obviates or mitigates one or more deficiencies of the existing technologies.

This background information is provided to reveal information believed by the applicant to be of possible relevance to the present disclosure. No admission is necessarily intended, nor should be construed, that any of the preceding information constitutes prior art against the present disclosure.

SUMMARY

Embodiments of the present disclosure provide an optical beamforming crossbar array, and associated methods, apparatus and systems. This can be used to provide a (e.g. fully-connected) optical beamforming system using crossbar arrays. Transmit and receive beamforming can be supported. Furthermore, multiple users or independent data streams can be supported.

In accordance with an embodiment of the present disclosure, there is provided a photonic apparatus comprising: one or more input optical waveguides, a plurality of output optical waveguides, and a plurality of photonic processing components, each coupling an input optical waveguide to an output optical waveguide. The input optical waveguides, output optical waveguides and photonic processing components form part of an optical crossbar array. The photonic apparatus further includes a plurality of balanced photodetectors, a plurality of antenna ports for coupling to a respective plurality of antennas of an antenna array, one or more electronic radiofrequency processing sections of an antenna array beamforming system, and a plurality of electrically controllable light modulators.

Each input optical waveguide is configured to propagate a different respective optical input signal, each optical input signal residing in a different wavelength band. Each output optical waveguide is configured to provide a respective optical output signal.

Each photonic processing component includes an input coupler, a controllable device, and an output coupler. The input coupler is configured to couple a portion of the optical input signal from one of the input optical waveguides and provide said portion at a coupler output port. The controllable device is configured to receive light from said coupler output port and provide a controllable fraction of said received light at a device output port. The output coupler is configured to receive light from said device output port, filter said received light from said device output port to produce output light, and couple said output light onto one of the output optical waveguides to provide (at least) a portion of the optical output signal thereof.

Each of the balanced photodetectors is operatively coupled to a respective pair of the plurality of output optical waveguides and is configured to produce an electrical output signal indicative of a difference between a pair of said optical output signals provided by said pair of the plurality of output optical waveguides.

Each of the electrically controllable light modulators is configured to convert a respective electrical input signal into the respective optical input signal of a respective one of the input optical waveguides.

The photonic apparatus can be configured to provide a receiver configuration, a transmitter configuration, or both. To provide the receiver configuration, each one of the plurality of antennas is operatively coupled to a respective one of the electrically controllable light modulators to cause the optical input signal of a respective one of the input optical waveguides to represent output of said one of the plurality of antennas. Furthermore, each one of the plurality of output optical waveguides is operatively coupled to multiple ones of the photonic processing components to receive and combine controllably weighted versions of multiple respective ones of the optical input signals therefrom in order to perform received antenna signal combining. Furthermore, each one of the electronic radiofrequency processing sections is configured to receive output from a respective pair of the plurality of balanced photodetectors and produce a respective one of one or more independent receive signals as concurrently received by the antenna array.

When only a single user is to be served and the apparatus operates in the receiver configuration, a single electronic radiofrequency processing section may be provided. Otherwise, typically a plurality of electronic radiofrequency processing sections are provided. The number of independent receive signals typically matches the number of electronic radiofrequency processing sections.

To provide the transmitter configuration, each one of the electronic radiofrequency processing sections is configured to receive a respective one of a plurality of independent transmit signals for concurrent transmission by the antenna array and perform a radiofrequency mixing operation involving said one of the plurality of independent transmit signals to generate a respective converted transmit signal. Each one of the electronic radiofrequency processing sections is operatively coupled to a respective one of the electrically controllable light modulators to cause the optical input signal of a respective one of the input optical waveguides to represent said respective converted transmit signal. Furthermore, each one of the plurality of output optical waveguides is operatively coupled to one or more of the photonic processing components. In some embodiments, e.g. when only a single user is supported, each output optical waveguide is coupled to a single photonic processing component. In some embodiments, e.g. when multiple users are supported, each one of the plurality of output optical waveguides is operatively coupled to multiple ones of the photonic processing components to receive and combine controllably weighted versions of multiple respective ones of the optical input signals therefrom in order to perform transmit signal combining. Furthermore, each one of the plurality of antennas is driven based a combined output from a respective pair of the plurality of balanced photodetectors.

In various embodiments, the controllable devices of the photonic processing components are collectively configured, at least in part by setting of said controllable fraction, to cause at least one set of four of the optical output signals to collectively carry a complex-weighted representation of one or a multiplexed collection of the input optical signals. In some further embodiments, the complex-weighted representation is configured to implement analog operations of a beamforming precoder or combiner. In some embodiments, the photonic apparatus includes a controller operatively coupled to the controllable devices and configured to set said controllable fractions thereof.

In some embodiments, the controllable device is a controllable optical attenuator, such as a variable optical attenuator (VOA).

In other embodiments, the controllable device is configured to provide a second controllable fraction of said received light at a second device output port. The controllable fraction and the second controllable fraction are formed at least in part by separating light from said coupler output port into two portions. In such embodiments, each of the plurality of photonic processing components further comprises a second output coupler configured to receive light from said second device output port, filter said received light from said second device output port to produce second output light, and couple said second output light onto another one of the output optical waveguides to provide at least a portion of the optical output signal thereof. In some such embodiments the controllable device is a tunable optical switch operable to separate light received from said coupler into said two portions, each of the two portions being spectrally similar. The tunable optical switch may be a phase change material (PCM)-based optical switch.

In various embodiments, each optical output signal comprises a plurality of sub-signals each representative of a different respective one of the input optical signals. In such embodiments, the photonic apparatus further comprises a set of input delay components each operatively coupled to a corresponding one of the input optical waveguides, the set of input delay components collectively configured to cause synchronization between the plurality of sub-signals. In some further embodiments, at least one of the set of input delay components comprises a length-extended portion of said corresponding one of the input optical waveguides.

In some embodiments, a plurality of the optical output signals collectively represent a complex-weighted output signal. In such embodiments, the photonic apparatus further comprises a set of output delay components each operatively coupled to a corresponding one of the output optical waveguides. The set of output delay components are collectively configured to cause synchronization between said plurality of the optical output signals. In some such embodiments, at least one of the set of output delay components comprises a length-extended portion of said corresponding one of the output optical waveguides.

In some embodiments, the output coupler is configured to perform bandpass filtering of said received light. This bandpass filtering passes light having wavelengths at and around a center wavelength which matches with a center wavelength of the optical input signal propagated by the input optical waveguide to which the output coupler is operatively coupled. The output coupler may comprise a microring resonator.

In some embodiments, for the receiver configuration, each of the electronic radiofrequency processing sections is configured to perform a set of frequency downconversion and demodulation operations involving said outputs from the respective pair of the plurality of balanced photodetectors.

In some embodiments, for the transmitter configuration, each of the electronic radiofrequency processing sections is configured to perform a set of modulation and frequency upconversion operations involving said one of the plurality of independent transmit signals.

According to various embodiments, the photonic apparatus includes an optical crossbar array having one or more input optical waveguides, a plurality of output optical waveguides, and a plurality of photonic processing components. Each of the output optical waveguides may be coupled to multiple ones of the input optical waveguides via multiple respective ones of the photonic processing components. If there is only one input optical waveguide, each output optical waveguide may be coupled to it via a different respective photonic processing component. Each of the photonic processing is configured to pass a controllable fraction of optical signal from a respective one of the input optical waveguides to a respective one of the output optical waveguides. The apparatus further includes a plurality of photodetectors each configured to convert output of one or more of the output optical waveguides into one or more electrical output signals. The apparatus further includes a plurality of antenna ports for coupling to a respective plurality of antennas of an antenna array. The apparatus further includes one or more electronic radiofrequency processing sections of an antenna array beamforming system. The apparatus further includes a plurality of electrically controllable light modulators each configured to cause an optical input signal to propagate into a respective one of the input optical waveguides, the optical input signal converted from a respective electrical input signal.

In some such embodiments, to provide a receiver configuration: each one of the plurality of antennas is operatively coupled to a respective one of the electrically controllable light modulators to cause a corresponding one of the optical input signals to represent output of said one of the plurality of antennas. Furthermore, each one of the plurality of output optical waveguides is operatively coupled to multiple ones of the photonic processing components to receive and combine controllably weighted versions of multiple respective ones of the optical input signals therefrom in order to perform received antenna signal combining. Furthermore, each one of the electronic radiofrequency processing sections is configured to receive output from one or more of the plurality of photodetectors and produce a respective one of a plurality of independent receive signals as concurrently received by the antenna array.

In some such embodiments, to provide a transmitter configuration: each one of the electronic radiofrequency processing sections is configured to receive a respective one of a plurality of independent transmit signals for concurrent transmission by the antenna array and perform a radiofrequency mixing operation involving said one of the plurality of independent transmit signals to generate a respective converted transmit signal, each one of the electronic radiofrequency processing sections being operatively coupled to a respective one of the electrically controllable light modulators to cause the optical input signal of a respective one of the input optical waveguides to represent said respective converted transmit signal. Furthermore, each one of the plurality of output optical waveguides is operatively coupled to one or more of the photonic processing components. In some embodiments, each one of the plurality of output optical waveguides is operatively coupled to multiple ones of the photonic processing components to receive and combine controllably weighted versions of multiple respective ones of the optical input signals therefrom in order to perform transmit signal combining. Furthermore, each one of the plurality of antennas is driven based output from one or more of the photodetectors.

Other features and variations of the above-described photonic apparatus, in either or both of the transmitter or receiver configuration, can also be provided for, as already discussed above.

According to various embodiments, there is provided a method commensurate with the above-described features of a photonic apparatus. The method may comprise, for example, propagating optical input signals via input optical waveguides, providing output optical signals via output optical waveguides, receiving and providing light via parts of photonic processing components, receiving light from output optical waveguides and providing electrical output signals by balanced photodetectors, converting electrical input signals into optical input signals using electrically controllable light modulators, etc.

Embodiments have been described above in conjunction with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
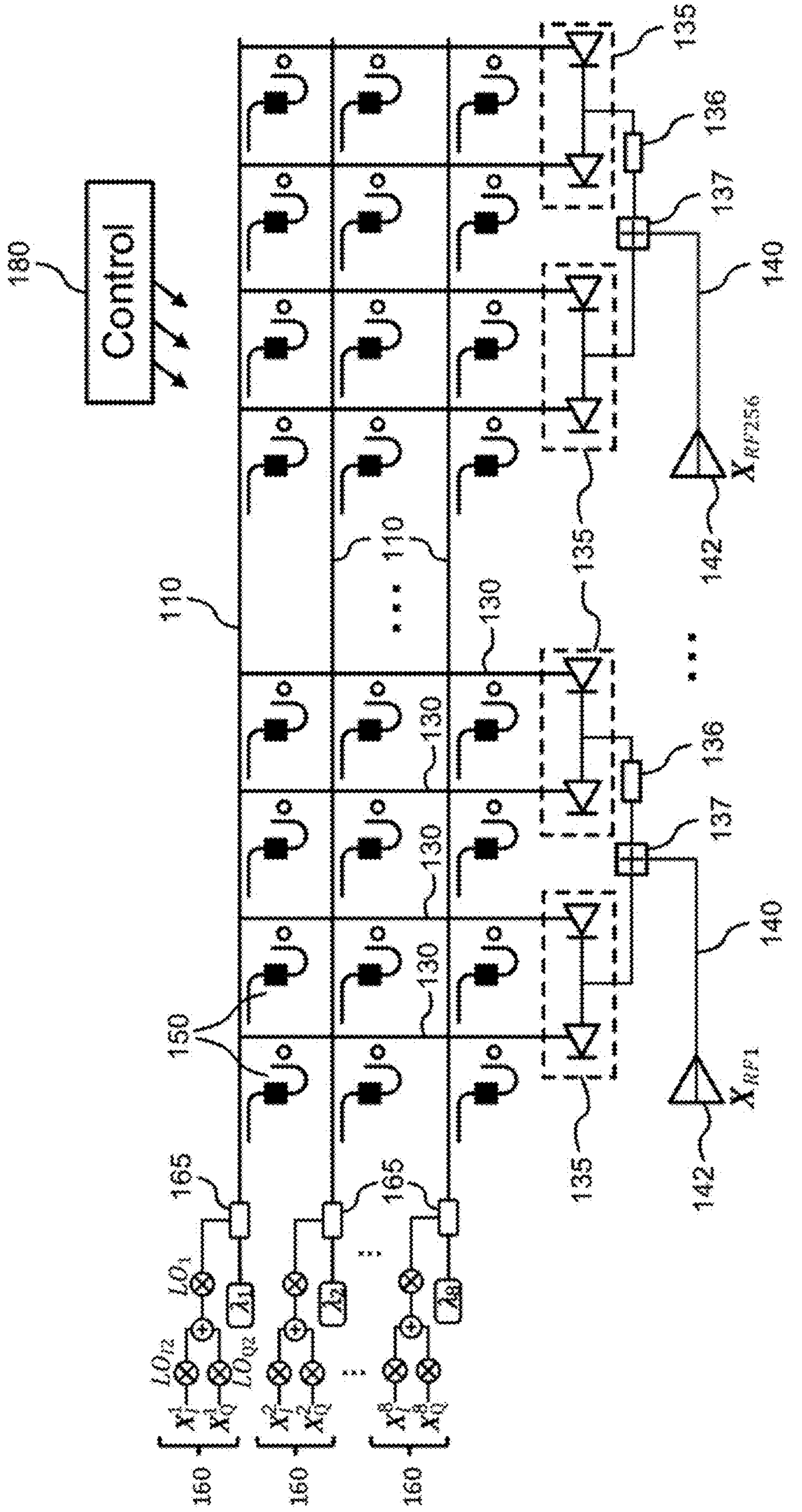
FIG. 1 illustrates a photonic apparatus in a transmitter configuration, according to an embodiment of the present disclosure.

Embodiments of the present disclosure relate to an optical beamforming system, including an optical crossbar array. Both a transmitter and receiver configuration of the optical beamforming system are provided, these configurations both being built using a same or similar optical crossbar array structure. The optical crossbar array includes input optical waveguides coupled to output optical waveguides via photonic processing components. The photonic processing components can pass a controllable amount of optical signal, thus allowing the signals to be weighted (in the optical domain) as a part of beamforming operations.

It is noted that the phrase "radiofrequency" is interpreted herein to include microwave and mm Wave frequencies, or more generally to include frequencies below those of visible light which may be usable for wireless communication via an electromagnetic antenna.

Embodiments of the present disclosure relate to an implementation of a Cartesian phase shifting-based optical beamforming network (OBFN). Complex weighting-based (CW) phase shifters can provide a relatively constant phase shift at all frequencies within the operating bandwidth of the device, thus leading to a relatively flat-phase shifter. They can also provide for a relatively compact footprint for example when compared with a true-time delay (TTD) Mach-Zehnder modulator (MZM) based OBFN. Complex (and signed) weightings can be implemented by using four photonic processing components operating in parallel.

Following this approach, a (e.g. fully-connected) optical beamforming architecture for precoding/combining in radiofrequency (RF) transceivers can be constructed. According to embodiments of the present disclosure, the analog portion of a hybrid beamformer is implemented in the optical domain. Potential benefits of this approach include benefits of size and insertion loss when compared to electronics-based implementations, while potentially mitigating or resolving the technical challenges of existing optical beamforming approaches.

According to various embodiments of the present disclosure, RF signals to be transmitted or received are channelized on a single optical waveguide using wavelength division multiplexing. The signals are phase shifted via complex Cartesian weighting, using photonic components. Technical background and details for a complex Cartesian weighting approach, which may be applied in various embodiments of the present disclosure, are described in S. Mondal, R. Singh, A. I. Hussein and J. Paramesh, "A 25-30 GHz Fully-Connected Hybrid Beamforming Receiver for MIMO Communication," IEEE Journal of Solid-State Circuits, vol. 53, no. 5, pp. 1275-1287, 2018, hereinafter referred to as "Mondal," and which is incorporated herein by reference.

The approach of Mondal is closely related to the implementation of a vector modulator, as would be readily understood by a worker skilled in the art. In Mondal, a receiver architecture is introduced, in which RF-domain complex-valued Cartesian weighting is applied to RF signals to realize the required phase shift for each of the RF signals. In Mondal's architecture, each RF-domain Cartesian weight is implemented by a pair of five-bit digitally controlled programmable-gain amplifiers, whose outputs are combined with the weighted signals from other antennas prior to the downconversion.

Photonic components serving to provide complex weightings in a Cartesian phase shifting implementation can require the capability of multiplexing a multi-wavelength signal in a fan-in way and the transmission attenuation at different carrier wavelengths. In the meantime, the changing of the amplitude (weighting) should not significantly influence the phase response at the readout among different carrier wavelengths. Embodiments of the present disclosure provide for an architecture which may fulfil the aforementioned requirements.

Crossbar array architectures have been investigated in electrical and optical domains. Such architectures are considered by the inventors to be good candidate component for a (e.g. fully-connected) OBFN, particularly as weight bank components thereof. By introducing a controllable device such as an optical attenuator or switch, along with an output coupler such as a passive MRR filter, into each unit of the crossbar array, the transmitted light at a specific wavelength (on resonance) can be weighted by changing the attenuation rate of the optical attenuator or switch, and mostly, or substantially fully coupled to an output (common bus) waveguide. The optical attenuator can be a variable optical attenuator (VOA), an electroabsorption material (EAM) device, or a phase change material (PCM) device, for example. The switch, as an alternative, is configured to split input light into two parts, and steer a first part to a first output and a second part to a second output, the two parts being controllable portions of the input light. The switch, also referred to as a tunable switch, may serve as a component of a weight bank and potentially increase input energy efficiency. Accordingly, a crossbar array, including a switch or attenuator and a (e.g. bandpass) filter is used to implement a (e.g. fully-connected) OBFN. Using filtering may facilitate operations such as wavelength division multiplexing (WDM).

It is noted that embodiments of the present disclosure can provide for a fully-connected OBFN. Additionally or alternatively, embodiments can be used to provide for a partially-connected OBFN. For example, a partially-connected OBFN may be implemented by stacking multiple (typically smaller-sized) fully-connected OBFNs. As a further example, a system of two N×M fully-connected beamformers may be considered to be a 2N×2M partially-connected OBFN.

FIG. 1 illustrates a photonic apparatus 100 according to an embodiment of the present disclosure. The apparatus is configured to provide a transmitter configuration, whereby signals from one, two or more sources (e.g. destined for different users) are provided for transmission by multiple antennas. When the photonic apparatus is in an infrastructure device such as a base station, the transmitter configuration can be used for downlink transmission. The number of sources can be eight and the number of antennas can be 256, for example. For purposes of illustration, three users and two antennas are explicitly shown by way of example.

The apparatus 100 includes one or more input optical waveguides 110 and a plurality of output optical waveguides 130, arranged in a crossbar manner, so that each input optical waveguide interfaces with a plurality of output optical waveguides. When multiple input optical waveguides are present (e.g. when multiple signals are being handled), each output optical waveguide also interfaces with a plurality of input optical waveguides. The interfacing between input optical waveguides and output optical waveguides is performed via photonic processing components 150, which are described in greater detail in FIG. 2.

Each of the input optical waveguides 110 is configured to propagate a different respective optical input signal. In the present embodiment, each different optical signal is representative of a different independent transmit signal. Furthermore, different optical input signals of different input optical waveguides may reside in different respective wavelength bands. Similarly, each of the output optical waveguides 130 is configured to provide a respective optical output signal which may include amplitude-controlled portions of one, two or more optical input signals.

Here and elsewhere, although the input optical waveguides 110 and output optical waveguides 130 are shown as intersecting at right angles, this intersection may be for schematic or layout convenience only, and optical signal is not intended to couple between input and output optical waveguides by a significant amount (or at all) at such right-angled intersections. Rather, optical signals are coupled primarily or solely via the photonic processing components.

Figure 2:
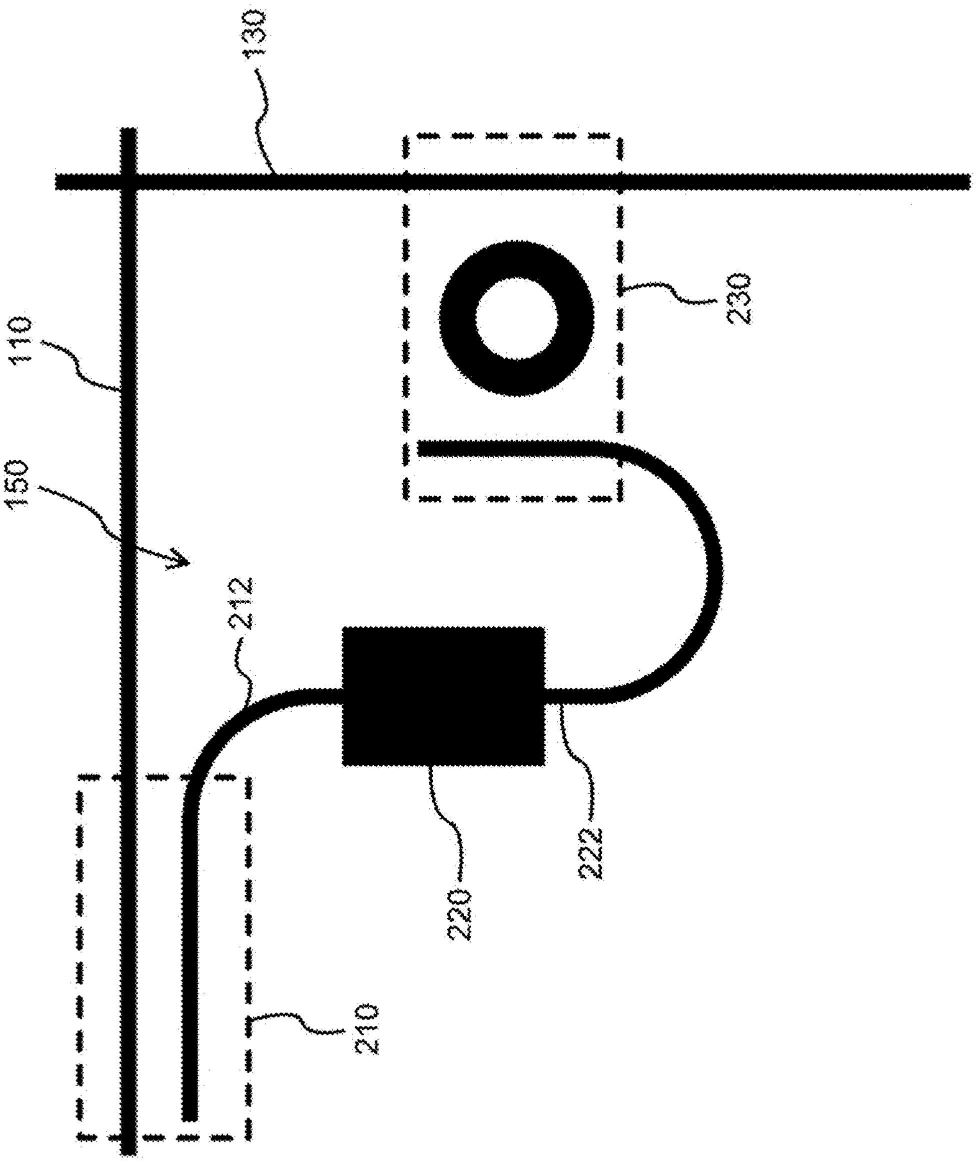
FIG. 2 illustrates a photonic processing component forming part of the photonic apparatus of FIG. 1 and for coupling input waveguides to output waveguides, according to an embodiment of the present disclosure.

Referring now to FIG. 2, each interface between an input optical waveguide 110 and an output optical waveguide 130 is via a photonic processing component 150. Each photonic processing component 150 includes an input coupler 210, a controllable device 220 and an output coupler 230.

The input coupler 210 is configured to couple a portion of the optical input signal from its associated input optical waveguide 110 and provide said portion at a coupler output port 212. The input coupler 210 may be a directional coupler (DC), for example. Typically, not all of the optical input signal is coupled to the input coupler, leaving remaining light to propagate toward a next input coupler. That is, the input coupler partially couples the optical input signal (input light) to the crossbar unit (photonic processing component). The amount of signal coupled to the input coupler is configurable at least during design and fabrication of the apparatus. The couplers may be configured for example so that each output optical waveguide receives substantially a same portion of light from an input optical waveguide. For example, for an input optical waveguide coupled to N output optical waveguides, the coupling strength of the input coupler 210 of the photonic processing component which couples the input optical waveguide to the $n^{th}$ of N output optical waveguide may be set to 1/(N−n+1). The coupling strength specifies the proportion of light, propagating in the input optical waveguide in the vicinity of the input coupler, which is coupled to the photonic processing component.

The controllable device 220 is configured to receive light from the coupler output port 212 and provide a controllable fraction of this received light at a device output port 222. That is, the controllable device 220 is coupled in series with the input coupler 210. The controllable device may be responsive to an electronic control signal for this purpose, for example as provided by an electronic controller (element 180 in FIG. 1). That is, the controllable fraction can be adjusted substantially continuously or in predetermined increments by a controller. This changes the light intensity transmitted through the photonic processing component. As mentioned above, the controllable device 220 may be a controllable optical attenuator such as a VOA or EAM or PCM device. Thus, the controllable device may output substantially all, substantially none, substantially 10%, 20%, or another electronically controllable fraction (in suitably small increments and over a suitably large range), of the light received thereby. The controllable device (e.g. VOA) may be a broadband device, in the sense that it attenuates or otherwise affects light similarly across a broad band of wavelengths, or at least across all operating wavelengths of the apparatus.

In various embodiments, the controller is a digital controller, for example including a digital signal processor (DSP), field programmable gate array (FPGA), application specific integrated circuit (ASIC), etc. The controller may further include a mixed-signal interface circuit, for example including one or more digital-to-analog converters (DACs), amplifiers, etc. The interface circuit may be used to actuate the device or antennas via analog control signals. The controller may be configured to bias the light modulator (e.g.

modulators 165). The controller may be configured to stabilize the center frequency of the output couplers (e.g. couplers 230).

It is noted that, in various embodiments, when describing the actions of a photonic device such as an input coupler or a controllable device (optical attenuator or switch), a fraction or portion of light output by the device will be spectrally similar to the light input to the device. That is, such devices may generally operate to vary an intensity of light, in contrast to dividing the light by wavelength and outputting a portion of light in one wavelength range, while discarding, absorbing or rerouting a portion of light in another wavelength range. It is noted that some spectral changes are to be expected by such a photonic device, but these changes are not (in such embodiments) the primary mechanism of action by which the device operates.

The output coupler 230 is configured to receive light from the controllable device output port 222, filter said received light from this device output port 222 to produce output light, and couple the resulting output light onto the associated output optical waveguide 130 to provide (at least) a portion of the optical output signal carried by this output optical waveguide 130. Thus, the output coupler 230 is coupled in series with the controllable device 220. The output coupler 230 may be a microring resonator (MRR)-based coupler, which further operates as a bandpass filter. Other types of couplers, such as a DC or contra-directional coupler (CDC), or a Bragg-grating filter may also be used, potentially along with a separate filter if required.

In more detail, the output coupler 230 may be configured to perform bandpass filtering of received light. This bandpass filtering may pass light having wavelengths at and around a center wavelength which matches with a center wavelength of a corresponding optical input signal, namely the optical input signal propagated by the input optical waveguide to which the photonic processing component (and thus the output coupler) is operatively coupled. The bandpass filtering may be passive in nature, and the output coupler also serves to couple light back to the common bus (output) optical waveguide.

The output coupler 230 may operate as an add-drop filter which facilitates multiplexing multiple optical signals (at different wavelengths) to a single output optical waveguide. Only a certain spectrally bandlimited portion of light, near the wavelength band of the input optical signal, will be coupled to the output optical waveguide. This is because the bandwidth of the output optical coupler 230 is limited, and thus it also serves as a bandpass filter. Without such an add-drop filter, multiplexing multiple input optical signals (via multiple respective photonic processing components), at different wavelengths, to a single output optical waveguide may tend to be significantly lossy, particularly when an output optical waveguide is to carry optical input signal components each corresponding to one of a large number of optical input signals.

Accordingly, in view of the above, each photonic processing component 150 operates to couple an electronically controllable portion of light from an input optical waveguide to an output optical waveguide, through control of the controllable device 220. The portions of light thus coupled can be configured to produce complex-valued weights which are used as part of an overall beamforming operation of the photonic apparatus.

Referring now back to FIG. 1, each of a plurality of balanced photodetectors (BPDs) 135 is operatively coupled to a respective pair of the plurality of output optical waveguides 130. As will be readily understood by a worker skilled in the art, a BPD produces an electrical output signal which is indicative of the difference between intensity of the pair of output optical signals provided respectively by the pair of output optical waveguides coupled to the BPD. It is noted that an output optical signal can have multiple components (or sub-signals) in different wavelength bands (due to portions of different input optical signals of different wavelengths) being used to generate the output optical signals). Accordingly, each photodetector (e.g. photodiode) of each BPD acts as a relatively wideband transducers, so that the output of the photodetector, and hence the output of the BPD, is representative of the combined intensity of all of these multiple components. The photodetectors thus act to sum together the intensities of these different components of the output optical signal.

The BPDs 135 are used to allow pairs of output optical signals to include weighted representations of input optical signals, where such weights can be signed, i.e. take on positive or negative values. The weights are represented as a subtraction of one positive value from another, for example as W=wp−wn. The input signals are split into pairs, whereby the weight components wp and wn are each applied to one element in a signal pair. The output photocurrent after differential detection of the signal pair (at a BPD) forms a weighted representation of the input signals with a signed weight.

FIG. 1 further illustrates a plurality of antenna ports 140 for operatively coupling to a respective plurality of antennas 142, with each port being coupled to a corresponding antenna. According to FIG. 1, outputs of two BPDs 135 are summed together at a combining node 137, after one of the two outputs is phase-shifted by 90 degrees via phase shifter 136, and output of the combining node 137 is provided to an antenna port 140. Accordingly, each one of the antennas is driven based on combined output of a pair of BPDs. The operation of pairs of BPDs 135 in this manner allows groups of four output optical signals to provide weighted representations of input optical signals, where the weights can be complex (i.e. can include "real" or in-phase and "imaginary" or quadrature parts). Each of these parts can be signed. In more detail, one pair of the four output optical signals (fed to the same first BPD) can be used to represent a real part of the weighted representation, which can be positively or negatively weighted as described above. Another pair of the four output optical signals (fed to a second BPD, the outputs of the first and second BPDs being combined together) can be used to represent an imaginary part of the weighted representation, which also can be positively or negatively weighted. These two pairs of signals together can be used to provide the complex-weighted representation.

Each of the output optical waveguides is operatively coupled to one or more of the photonic processing components. When there are multiple input optical waveguides (in order to support multiple independent transmit signals) each of the output optical waveguides is operatively coupled to multiple photonic processing components. Accordingly, the output optical waveguide is coupled, via such photonic processing components, to each of these multiple input optical waveguides. Due to this coupling, the output optical waveguide receives and combines controllably weighted versions of multiple respective ones of the optical input signals therefrom in order to perform transmit signal combining. A set of four output optical waveguides can thus collectively carry controllably complex (and signed) weighted representations of multiple input optical signals, received via multiple respective input optical waveguides.

In more detail, to support providing the complex-weighted representations, the controllable devices of the photonic processing components are collectively configured to cause a set of four of the optical output signals to collectively carry a complex-weighted representation of one or a multiplexed collection of the input optical signals. This action is achieved at least in part by setting of the controllable fractions of light output by the controllable devices. In various embodiments, the complex-weighted representation is performed in support of implementing analog operations of a beamforming precoder or combiner. The complex weights may be controllably selected, for example by a controller, as part of such a beamforming precoding or combining scheme. Thus, the scheme implemented by the optical crossbar array may be (or may be part of) an analog, optical implementation of such a precoder or combiner. It is considered that an optical implementation of the complex weightings and feed network may be more scalable than an electronic equivalent. Moreover, as these components may traditionally consume a large portion of integrated circuit area, the use of optical components here may be particularly beneficial.

FIG. 1 further illustrates a plurality of radiofrequency processing sections 160 of an antenna array beamforming system. These processing sections are typically electronic in nature, and perform operations such as mixing operations. The operations can include frequency conversions such as upconversions (for the transmitter configuration), or down-conversions (for the receiver configuration). The operations can include modulation (for the transmitter configuration), or demodulation (for the receiver configuration). The operations can be performed using digital electronics such as a digital signal processor, analog electronics, or a combination thereof. For the transmitter configuration currently under discussion, each of the radiofrequency processing sections may be configured to perform a set of modulation and frequency upconversion operations involving a respective one of the plurality of independent transmit signals. In the context of FIG. 1 the radiofrequency processing sections are used in a particular transmitter configuration. However, the term radiofrequency processing section is also used in a somewhat different but related context in a different, receiver configuration. It is noted that the radiofrequency processing sections (in both the transmitter and receiver configuration) are used to convert radiofrequency signals for processing. This may include down-conversion (e.g. to baseband) in the receiver configuration and up-conversion (e.g. from baseband) in the transmitter configuration. The radiofrequency processing sections are not necessarily fundamental to beamforming operation.

In various embodiments, and in particular with respect to the transmitter configuration, each radiofrequency processing section 160 is configured to receive a transmit signal for transmission by the antenna array. When more than one user or transmit signal is being supported, each electronic radiofrequency processing section is configured to receive a respective one of a plurality of independent such transmit signals for concurrent transmission by the antenna array. Each of the electronic radiofrequency processing sections is further configured to perform a radiofrequency mixing operation involving one of the transmit signals, to generate a respective converted transmit signal. Furthermore, each electronic radiofrequency processing section is operatively coupled to a respective electrically controllable light modulator 165, to cause the optical input signal of an input optical waveguides to represent an associated converted transmit signal. Thus, the optical input signals are generated to represent signals to be transmitted, and these signals are subsequently weighted in the optical crossbar array for beamforming purposes. Light modulators may receive light of a given fixed wavelength, which is modulated according to an electrical control input.

As illustrated, and by way of example, each $i^{th}$ electronic radio frequency processing section 160 may receive an in-phase signal $$X_I^i$$

and a quadrature signal $$X_Q^i.$$

Each signal is mixed with a signal from a respective local oscillator ($LO_{I2}$ or $LO_{Q2}$), the results are summed, and the result of the summation is mixed with a signal from another local oscillator ($LO_I$). The output of this mixture is used to drive the modulator 165.

In the context of FIG. 1 and transmitter configurations in general, a plurality of electrically controllable light modulators 165 are provided. Each light modulator 165 is configured to convert a respective electrical input signal into the respective optical input signal of a respective one of the input optical waveguides. The light modulators thus act as electrical-to-optical transducers. Various types of light modulators may be used, as would be readily understood by a worker skilled in the art. A light modulator 165 may be a Mach-Zehnder based modulator, for example.

In various embodiments, for the transmitter configuration, a base station with N antennas may serve K users, with beamforming. The required number of operational optical wavelengths may be equal the number of users K. That is, each input optical waveguide, one for each user, may have a different center wavelength. The number of parallel vertical bus waveguide channels, each having a pair of output optical waveguides, may be at least twice the number of antennas N. The number of photonic processing components (potentially each including a bandpass filtering MRR) in each output optical waveguide may be at least equal to the number of users K.

Figure 3:
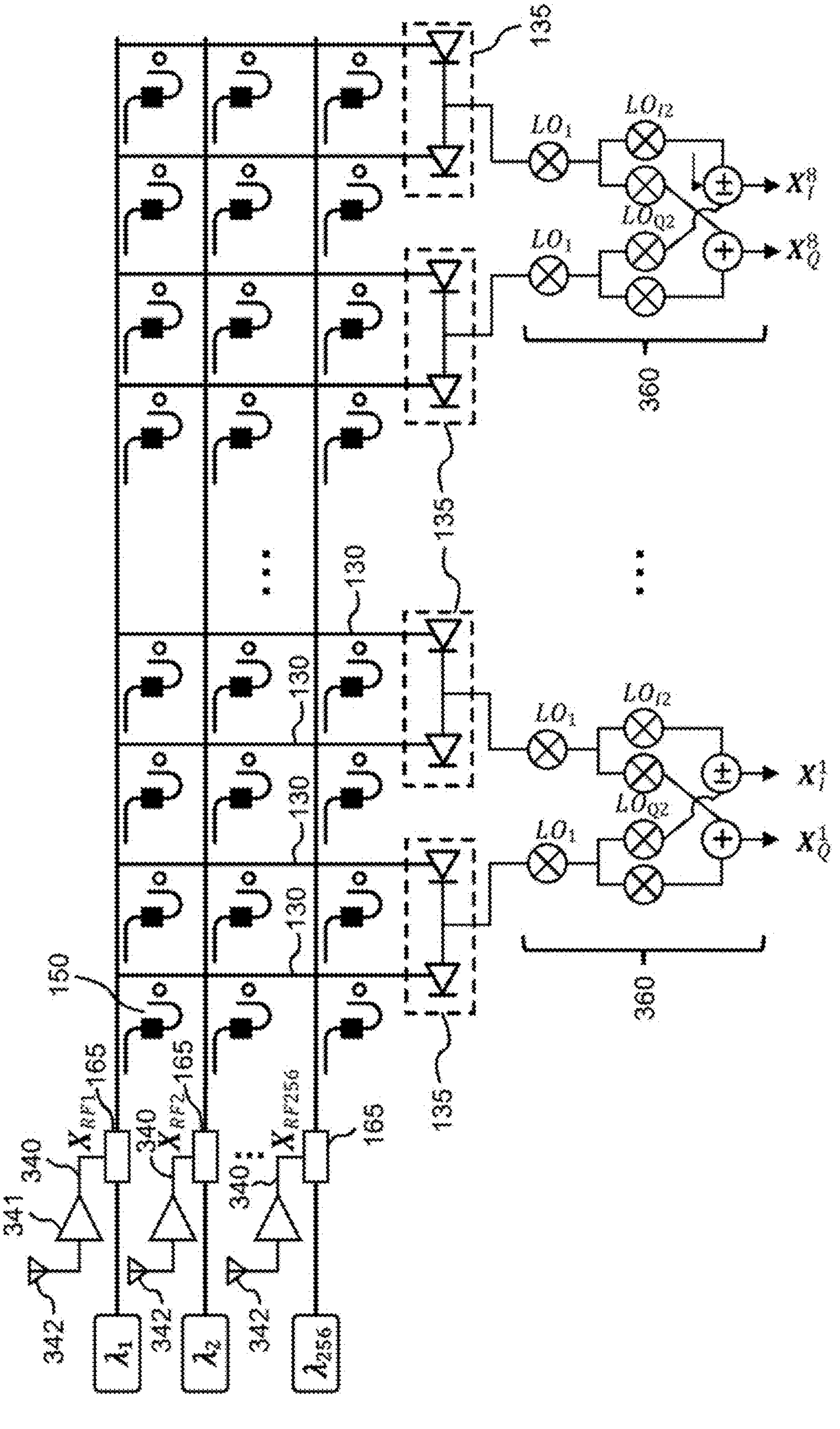
FIG. 3 illustrates a photonic apparatus in a receiver configuration, according to an embodiment of the present disclosure.

FIG. 3 illustrates a photonic apparatus 300 according to another embodiment of the present disclosure. The apparatus is configured to provide a receiver configuration, whereby signals received by multiple antennas are provided to one, two or more destinations (e.g. corresponding to received signal streams for different users). When the photonic apparatus is in an infrastructure device such as a base station, the receiver configuration can be used for uplink reception. The number of destinations can be eight and the number of antennas can be 256, for example. For purposes of illustration, two destinations and three (e.g. of 256) antennas are explicitly shown by way of example.

The structure and configuration of the optical components (and the optical-to-electrical and electrical-to-optical transducers) of FIG. 3 is similar to that of FIG. 1, and for clarity these details are not repeated. FIG. 3 differs from FIG. 1 primarily in the placement of the antenna ports 340 and antennas 342, and the placement and configuration of the radiofrequency processing sections 360. In both the transmitter and receiver configurations, the optical components are used to perform complex weighting of signals, in support of beamforming for one, two or more concurrent independent signals.

In more detail, in FIG. 3, each one of the plurality of antennas 342 is operatively coupled, via an antenna port 340, to a respective one of the electrically controllable light modulators 165 to cause the optical input signal of a respective one of the input optical waveguides to represent output of this one of the antennas. Accordingly, the antennas of the receiving array are used to drive the optical input signals. Low noise amplifiers (LNAs) 341 may be provided between the antennas 342 and the electrically controllable light modulators 165. The optical input signals thus substantially match with the signals provided by the antennas, but are optical versions of these signals rather than electrical versions.

Each one of the output optical waveguides 130 is operatively coupled to multiple ones of the photonic processing components 150 to receive and combine controllably weighted versions of multiple respective ones of the optical input signals. This is done to perform received antenna signal combining.

The electronic radiofrequency processing sections 360 of FIG. 3 differ from the processing sections 160 of FIG. 1 due to their use in receiving rather than transmitting signals. One electronic radiofrequency processing section 360 is provided for every user or independent receive stream. Each processing section 360 is configured to receive output from a respective pair of BPDs 135 and produce a respective independent receive signals as concurrently received by the antenna array. Each of the electronic radiofrequency processing sections 360 is configured to perform a set of frequency downconversion and demodulation operations involving the outputs from the respective pair of the plurality of balanced photodetectors. This, in combination with the complex weightings applied by the photonic processing components of the optical crossbar array, can be used to perform beamforming-based signal reception in an antenna array, potentially involving multiple concurrent received signal streams, for example serving multiple different users.

As illustrated, and by way of example, each $i^{th}$ electronic radio frequency processing section 360 may receive two components, each of which is mixed with a signal from a local oscillator ($LO_I$). The results of these mixtures are split into two parts and each part is mixed with a signal from another respective local oscillator ($LO_{I2}$ or $LO_{Q2}$). The results of this further mixture are added or subtracted together in the manner illustrated to generate an in-phase signal $$X_I^i$$

and a quadrature signal $$X_Q^i.$$

In various embodiments, for the receiver configuration, K users may transmit their signals to a base station (combiner) with N antennas. The required number of operational optical wavelengths may be equal the number of receiver antennas N. That is, each input optical waveguide, one for each antenna, may have a different center wavelength. The number of parallel vertical bus waveguide channels, each having a pair of output optical waveguides, may be at least twice the number of users K. The number of photonic processing components (potentially each including a bandpass filtering MRR) in each output optical waveguide may be at least equal to the number of receiver antennas N.

The above-described (and other) embodiments provide an implementation of optical beamforming for example in an uplink/downlink scenario in which UEs transmit their signals to a base station through a single transmission path, receive signals from the base station, or both. Embodiments of the present disclosure can be utilized in RF transceivers with a substantially arbitrary number of antennas at the base station and a substantially arbitrary number of transmitting users. The architecture can be applied for the precoding architecture at the transmitter side.

For further explanation of embodiments of the present disclosure, a discussion of phase shifts in a phased antenna array is now provided.

Figure 4:
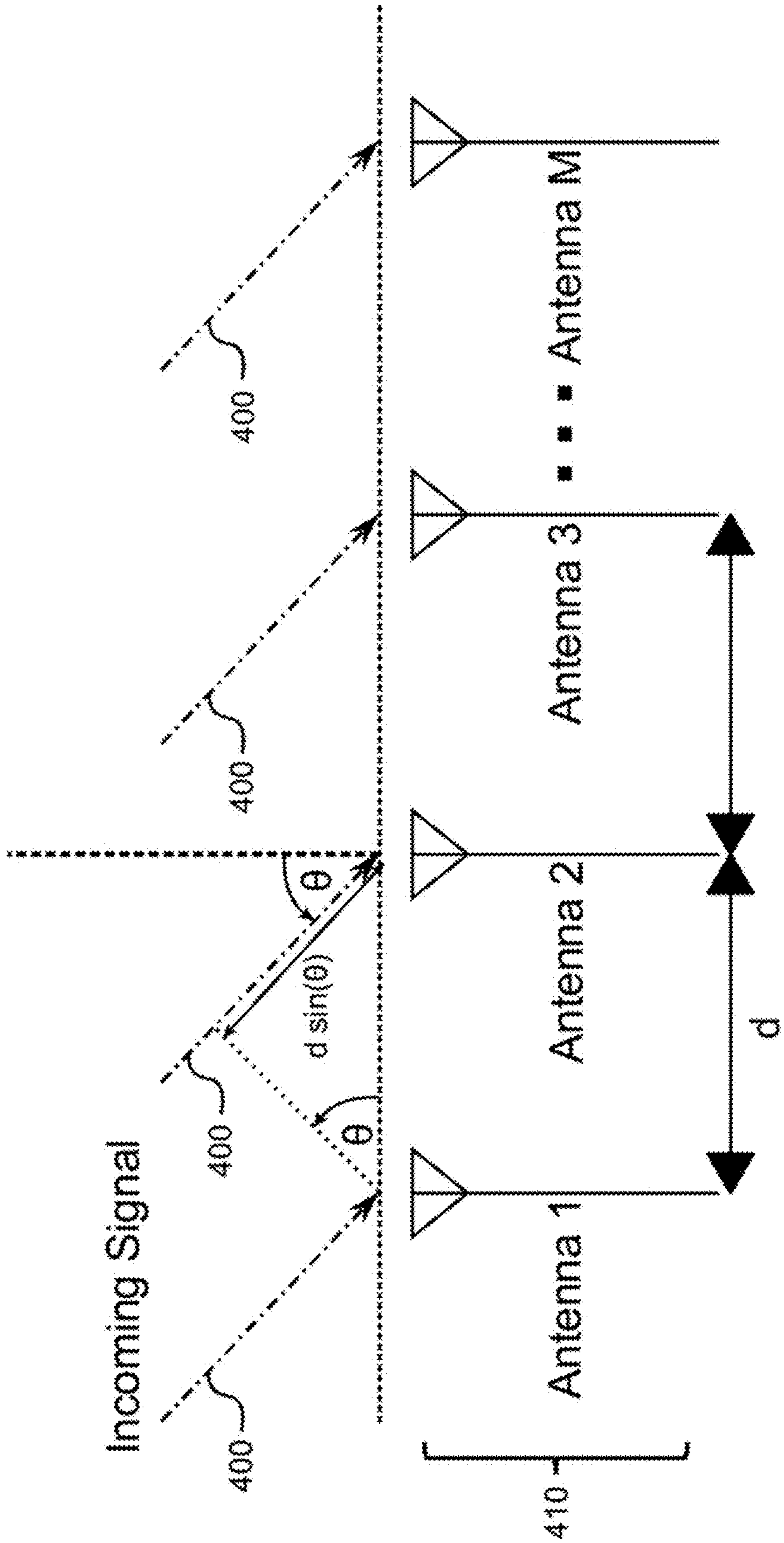
FIG. 4 illustrates an antenna array with a signal arriving at an angle, in support of embodiments of the present disclosure.

Focusing on a receiver configuration by way of example, the RF signal received by each individual antenna element in a phased array antenna experiences a phase shift as compared to the signal received in the adjacent antenna elements, due to the different signal propagation path to different antenna elements. In order to combine the received signals constructively, the signals received from different antenna elements are phase shifted according to the phase shift imposed by the different propagation paths of each of received signals. FIG. 4 illustrates the physical arrangement, in which an incoming signal 400 propagates with an angle of arrival θ relative to the antenna array 410, having multiple antennas with physical separation distance d.

In view of the above, let x(t) denote the transmitted RF signal with amplitude A, carrier frequency $f_{RF}$ (and wavelength λ), and the phase Ø, namely:

$$x(t) = A\cos(2\pi f_{RF} t + \emptyset). \tag{1}$$

If the angle of arrival of the signals is considered to be θ, then the phase shift between adjacent antenna elements placed at distance d can be obtained as:

$$\Delta\varphi = 2\pi\frac{d\sin\theta}{\lambda}. \tag{2}$$

Furthermore, the received signal at the $i^{th}$ antenna is:

$$y(t) = A\cos(2\pi f_{RF} t + \emptyset + (i-1)\Delta\varphi). \tag{3}$$

Accordingly, the signal received at the $i^{th}$ antenna is phase shifted by $(i-1)\Delta\varphi$ so that it can be combined with the signals received from other antennas constructively. As explained before, there are different approaches usable to apply such phase shifting to the received signal. The approach followed herein (which is not necessarily intended to be limiting) is comparable to the approach described in S. Mondal, R. Singh, A. I. Hussein and J. Paramesh, "A 25-30 GHz Fully-Connected Hybrid Beamforming Receiver for MIMO Communication," IEEE Journal of Solid-State Circuits, vol. 53, no. 5, pp. 1275-1287, 2018. In particular, phases are realized through complex Cartesian weights. The desired phase change $\varphi_{ik}$, for the signal related to the $k^{th}$ data stream received from the $l^{th}$ antenna, is realized by separately multiplying the received signal with two scalars $$A_{lk}^{r}$$

and $$A_{lk}^{i}$$

such that:

$$\varphi_{lk} = \tan^{-1}\left(\frac{A_{lk}^{i}}{A_{lk}^{r}}\right), \tag{4}$$

and $$\sqrt{A_{lk}^{r\,2} + A_{lk}^{i\,2}} = 1.$$

In a (e.g. fully connected) beamforming architecture according to embodiments of the present disclosure, the real and imaginary coefficients, $$A_{lk}^{r}$$

and $$A_{lk}^{i},$$

are applied photonically to the signals through broadband attenuators in the photonic processing components (crossbar units). For example, a pair of photonic processing components, coupled to the same BPD, can be used to weight optical signals to form a representation of those optical signals as weighted by $$A_{lk}^{r}.$$

Another pair of photonic processing components, coupled to another same BPD, can be used to weight optical signals to form a representation of those optical signals as weighted by $$A_{lk}^{i}.$$

These two representations can be combined together in the electrical domain.

Figure 5:
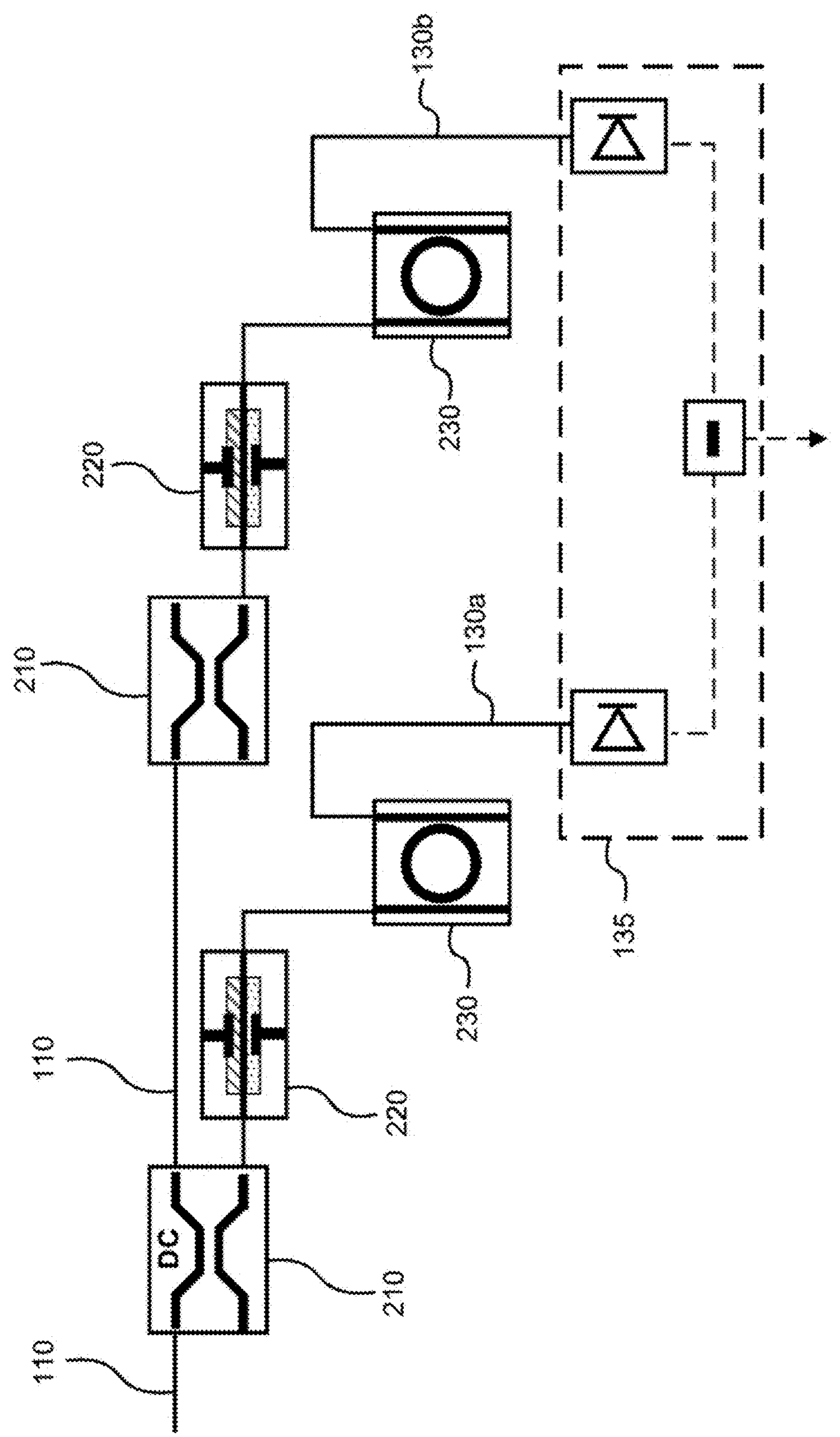
FIG. 5 schematically illustrates the coupling between one input optical waveguide and a pair of output optical waveguides, according to an illustrative embodiment of the present disclosure.

As described above, the crossbar OBFN technology that implements the complex Cartesian weights in embodiments of the present disclosure includes an input coupler (e.g. DC) configured to (e.g.) partially couple an optical signal to the crossbar unit, a controllable device (e.g. broadband VOA) to change the transmitted light intensity, and an output coupler (e.g. and a passive bandpass filter such as an MRR) configured to couple the resulting light to an output optical (common bus) waveguide. Output optical signals on the output optical waveguides are detected simultaneously at BPDs. Each BPD may produce a photocurrent proportional to the difference between the transmission of the BPD's through and drop ports (two output optical signals), resulting in an effective weight in the range [−1,1] on the input signal depending on its attenuation difference between two crossbar units. FIG. 5 schematically illustrates the coupling between one input optical waveguide 110 and a pair of output optical waveguides 130*a*, 130*b*. The weights can be tuned by applying voltages to the controllable devices 220 (e.g. VOAs). This may provide for an attenuation coefficient change due for example to the free-carrier plasma injection effect. As in FIG. 1, input couplers 210 couple light from the input optical waveguide 110 and provide this coupled light to the controllable devices 220, which in turn provide output to output couplers 230. The output couplers couple light onto the output optical waveguides 130*a*, 130*b* which provide input to a BPD 135. The BPD outputs a signal indicative of the difference in intensity of light between the two output optical waveguides 130*a*, 130*b*.

It is considered that, in various embodiments as described herein, no resonance cavity exists in the controllable device. Accordingly, no obvious group delay-cause phase change is observed at the BPD ports. By changing the attenuation coefficient, the amplitude changes accordingly, with negligible phase change. As such, the phase is substantially invariant at radio frequencies. In other words, the group delay variation induced by actuating the controllable device (e.g. attenuator or tunable switch) is negligible relative to the period of the RF signal According to the above-described embodiments, the controllable device (e.g. VOA) has a single input and a single output, and operates to attenuate light at its input by a controllable amount and provide that attenuated light at its output. However, in other embodiments, as described in more detail below, a tunable optical switch-based controllable device is used. This may provide the benefit of additional efficiency, because rather than attenuating light, the light can be split into two parts (e.g. with a controllable splitting ratio), each of which is used for feeding a different optical output waveguide.

Figure 6:
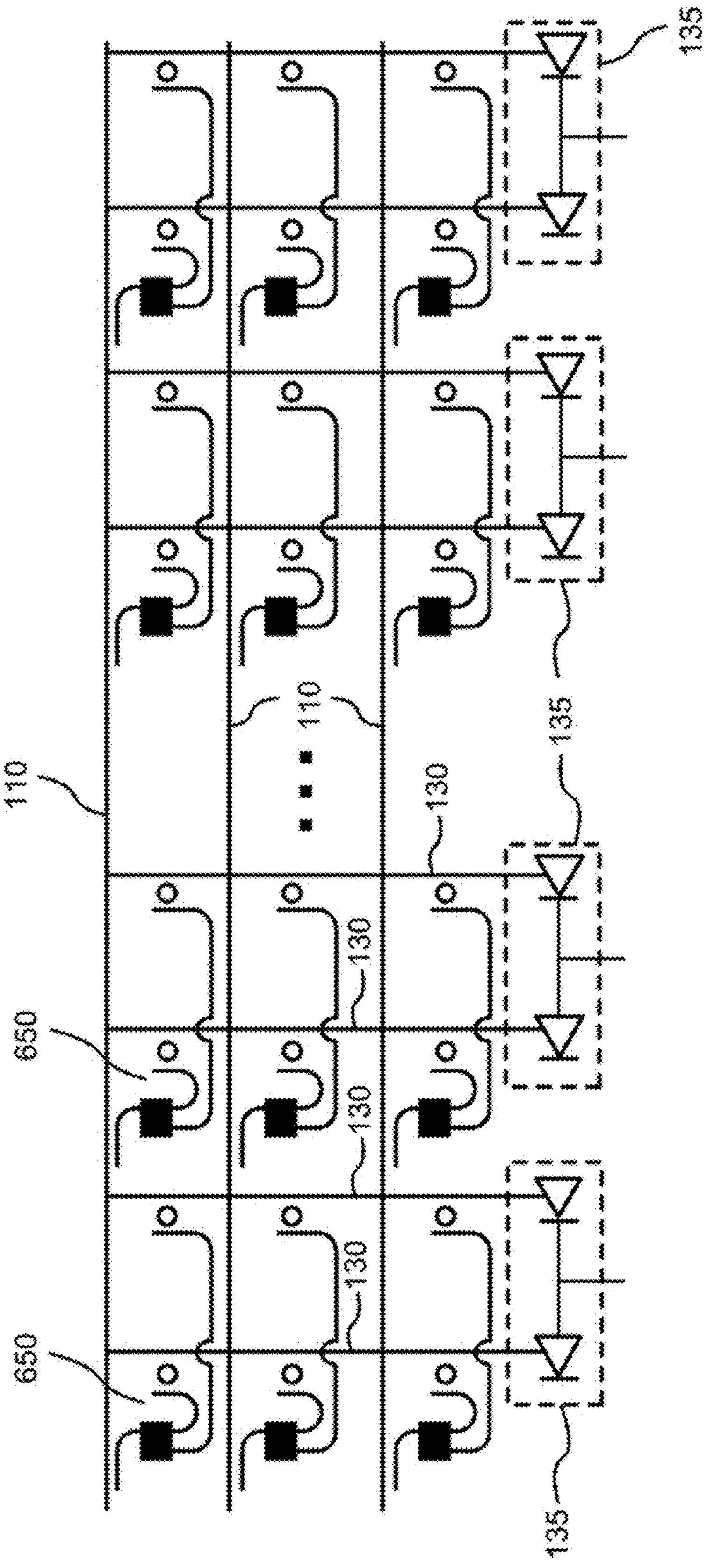
FIG. 6 illustrates a portion of a photonic apparatus according to embodiments of the present disclosure, in which controllable devices used for weighting signals are provided having two output ports, e.g. as a tunable switch.

FIG. 6 illustrates a portion 600 of a photonic apparatus according to embodiments of the present disclosure, in which the controllable devices are provided having two output ports. In order to provide the transmitter or receiver configuration of the photonic apparatus as described herein, photonic processing components and antenna ports can be provided as described and illustrated with respect to FIGS. 1 and 3. These details are not repeated here. As described elsewhere, the portion 600 of the photonic apparatus includes one or more input optical waveguides 110 and a plurality of output optical waveguides 130. Each input optical waveguide 110 is coupled to a pair of output optical waveguides 130 via a photonic processing component 650.

Figure 7:
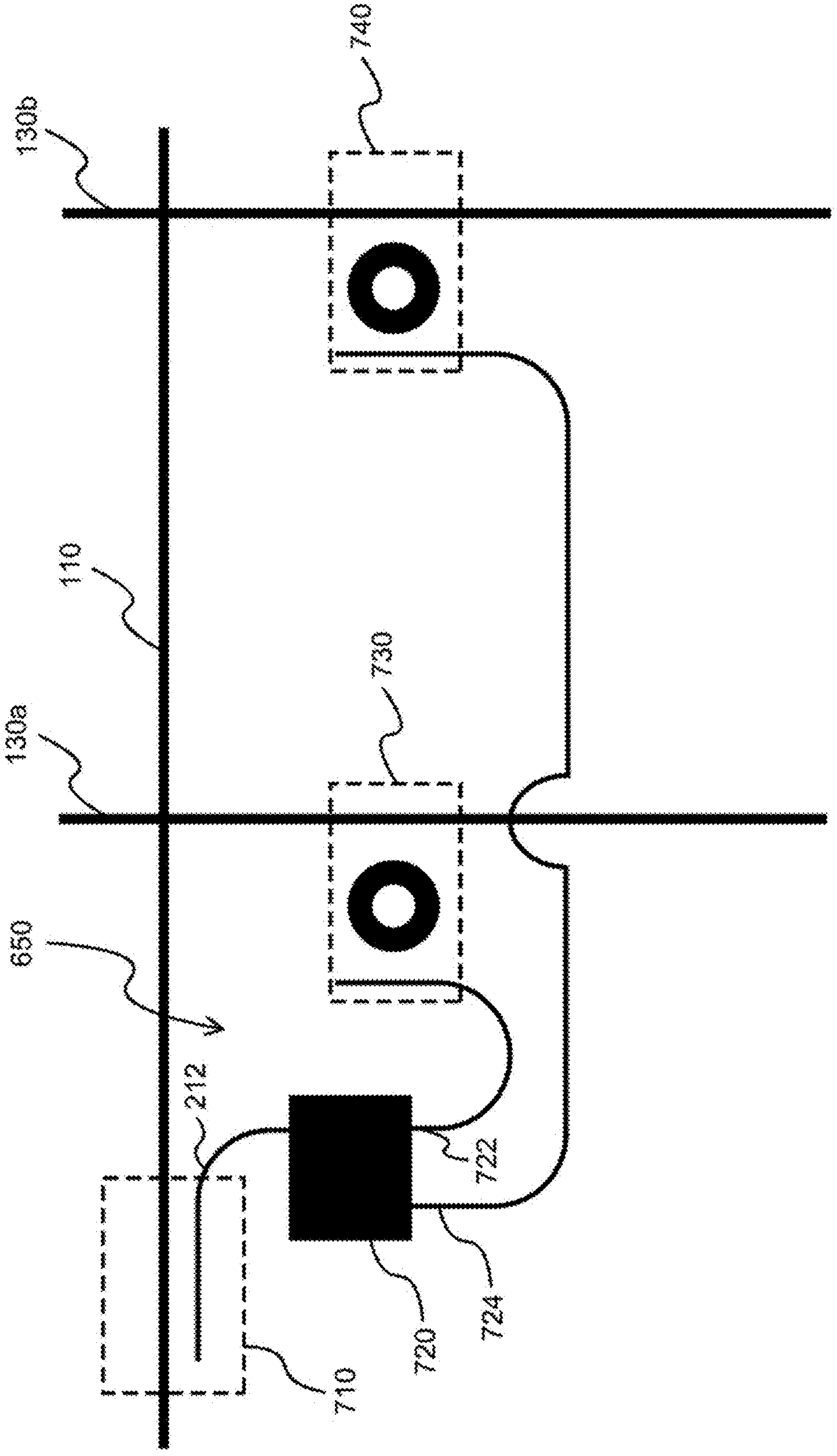
FIG. 7 illustrates a photonic processing component forming part of the photonic apparatus of FIG. 6, according to an embodiment of the present disclosure.

FIG. 7 illustrates a photonic processing component 650 of FIG. 6 in more detail. Each photonic processing component 650 includes an input coupler 710, a controllable device 720, a first output coupler 730 and a second output coupler 740.

The input coupler 710 is similar or identical to the input coupler 210 of FIG. 2, and is configured to couple a portion of the optical input signal from its associated input optical waveguide 110 and provide said portion at a coupler output port 712. The controllable device 720 is configured to receive light from the coupler output port 712 and provide a first controllable fraction of this received light at a first device output port 722, and a second controllable fraction of the received light at a second device output port 724. The controllable device may be responsive to an electronic control signal for this purpose, for example as provided by an electronic controller. The first and second controllable fractions may add to substantially 100% in various embodiments. The first and second controllable fractions may be formed at least in part by separating light provided by coupler output port 712 into two portions. These portions may be spectrally similar to one another and to the light of the coupler output port. In other words, the separation may be a separation in intensity, rather than a separation based on wavelength.

Thus, the controllable device 722 may output substantially all, substantially none, substantially 10%, 20%, or another electronically controllable fraction (in suitably small increments and over a suitably large range), of the light received thereby at the first device output port 722, and may output substantially the remainder (or a lesser amount) of the light received thereby at the second device output port 722. The controllable device may again be a broadband device, in the sense that it separates or otherwise affects light similarly across a broad band of wavelengths, or at least across all operating wavelengths of the apparatus.

The first output coupler 730 is similar or identical to the output coupler 230 of FIG. 2, but is configured to receive light from said the controllable device first output port 722, filter said received light from this device first output port 722 to produce output light, and couple the resulting output light onto one associated output optical waveguide 130*a* to provide (at least) a portion of the optical output signal carried by this output optical waveguide 130*a*. Thus, the first output coupler 730 is coupled in series with the controllable device 720.

The second output coupler 740 is also similar or identical to the output coupler 230 of FIG. 2, but is configured to receive light from said the controllable device second output port 724, filter said received light from this device second output port 724 to produce output light, and couple the resulting output light onto another output optical waveguide 130*b* to provide (at least) a portion of the optical output signal carried by this output optical waveguide 130*b*. Thus, the second output coupler 740 is also coupled in series with the controllable device 720.

Accordingly, in view of the above, each photonic processing component 650 operates to couple an electronically controllable portion of light from an input optical waveguide to a pair of output optical waveguides, through control of the controllable device 720. The portions of light thus coupled can be configured to produce weights which are used as part of an overall beamforming operation of the photonic apparatus.

In various embodiments, the controllable device 720 is a tunable optical switch which is operable to separate light received from said coupler into two portions, each of the two portions being spectrally similar. The tunable optical switch may be a phase change material (PCM)-based optical switch. Other types of switches can also be used, provided that the device is controllable to separate input light into two controllable portions with sufficiently fine resolution.

Figure 8:
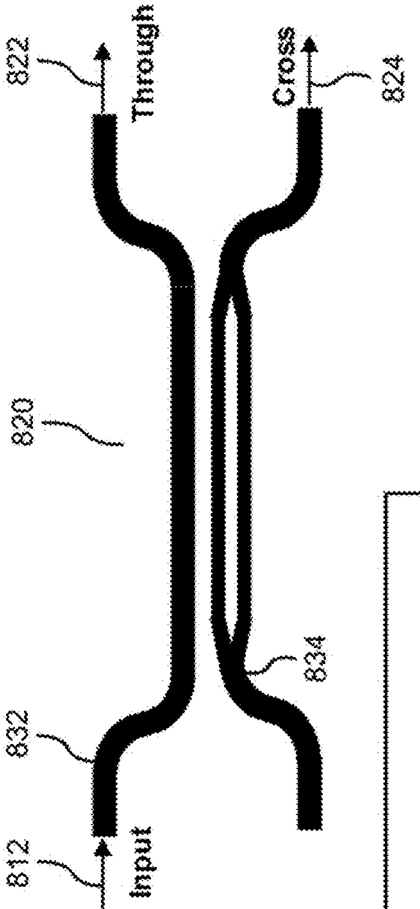
FIG. 8 illustrates a PCM-based tunable optical switch which may be configured as a controllable device for weighting signals in the optical domain, according to an embodiment of the present disclosure.
Figure 8:
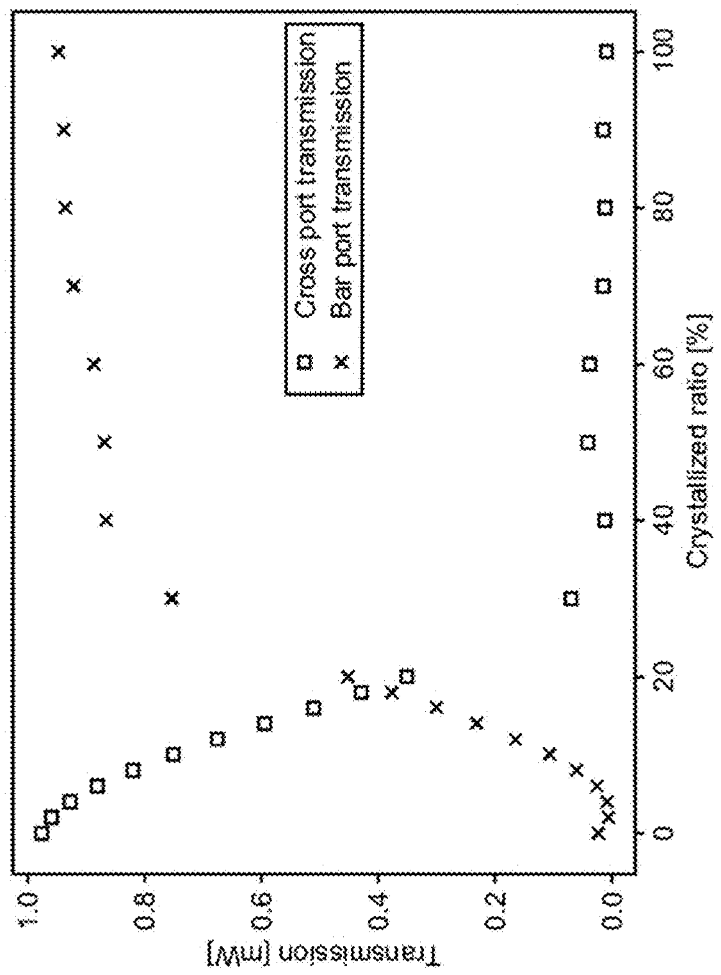

FIG. 8 illustrates a PCM-based optical switch 820 which may be configured as the controllable device 720 according to an embodiment of the present disclosure. The switch includes an input port 812, a first output port 822 and a second output port 824. The switch further includes a pair of coupled (e.g. silicon) waveguides 832, 834. By implementing an electrically controlled index-tunable component (e.g. stimulated Brillouin scattering SbS material) into one of the waveguides 832, 834, a tunable switch can be implemented. When the PCM is in a substantially fully amorphous state, the effective index of the SbS waveguide is close to that of the other non-SbS waveguide. In this case, close to 100% coupling to the cross port (second output port 824) can occur so that substantially all input light (presented to input port 812) is coupled to this cross port. When the PCM is in a substantially fully crystalline state, the effective index of the SbS waveguide is significantly different from that of the other non-SbS waveguide. In this case, close to 0% coupling to the cross port (second output port 824) occurs, and instead substantially all input light is coupled to the bar port (first output port 822). By varying the proportion of the PCM which is in the crystalline state (e.g. between about 5% and about 50%), some of the light presented at the input port 812 can be coupled to the bar port 822 and the remaining light can be coupled to the cross port 824. The amounts of light coupled to the cross and bar ports can be controllable in increments of a given precision. Thus, a tunable switch is implemented. Various other implementations of tunable switches, as will be readily understood by a worker skilled in the art, can be provided. For example, the SbS material in the above-described implementation can be replaced by another index-tunable material with suitably low attenuation, such as PN-junctions and electro-optic (EO) polymers. Also, significantly different switch architectures can be used.

Notably, using an attenuator as the controllable device (e.g. as in FIG. 2) may cause a significant amount (e.g. average of 50%) of the optical input signal to be lost during the intensity modulation. The tunable switch implementation of FIGS. 6 to 8 may mitigate such losses. By adjusting the refractive index of the coupling arm in the tunable switch, the coupling strength can be adjusted from 0 to 100%, which returns weights in the range of [−1, +1] after subtraction between BPDs. In a lossless system, substantially all input power is used for intensity modulation.

In an example implementation of a tunable switch, by using SbS-slot waveguide to provide the tunable directional coupler, when changing the status of the SbS, the coupling ratio changes from 100% to almost 0%, thus allowing a tunable switching of the input light. From the 3D finite difference time domain (FDTD) simulation, an insertion loss −0.048 to −0.02 dB is observed at 1550 nm wavelength.

It is considered that, in embodiments of the present disclosure, additional controllable devices, such as VOAs, EAM devices or PCM devices, can be coupled in series with the tunable switch-based controllable device 720. For example, such single-input, single-output controllable devices acting as attenuators can be provided prior to an input to the controllable device 720, or at one or both output ports of the controllable device 720. This may provide for further controllability, if necessary.

In the optical crossbar structure as schematically illustrated thus far, different optical paths, each being between a different respective light modulator (e.g. light modulator 165) and a different respective photodetector (e.g. of BPD 135) can, without further design intervention, have different lengths. Thus, for example, in FIG. 1, the optical path between any given light modulator 165 and the leftmost BPD 135 input may be shorter than the optical path between that same light modulator 165 and any other illustrated BPD input. As another example, the optical path between the lowermost light modulator 165 and any given BPD 135 input may be shorter than the optical path between any other light modulator 165 and that same given BPD input. Such path length variations can potentially cause time-delay induced phase variation between different crossbar units or input-output signal pairs. This phase variation can be problematic for beamforming. Accordingly, embodiments of the present disclosure provide for path length or delay equalization between different optical paths in the crossbar array.

Figure 9:
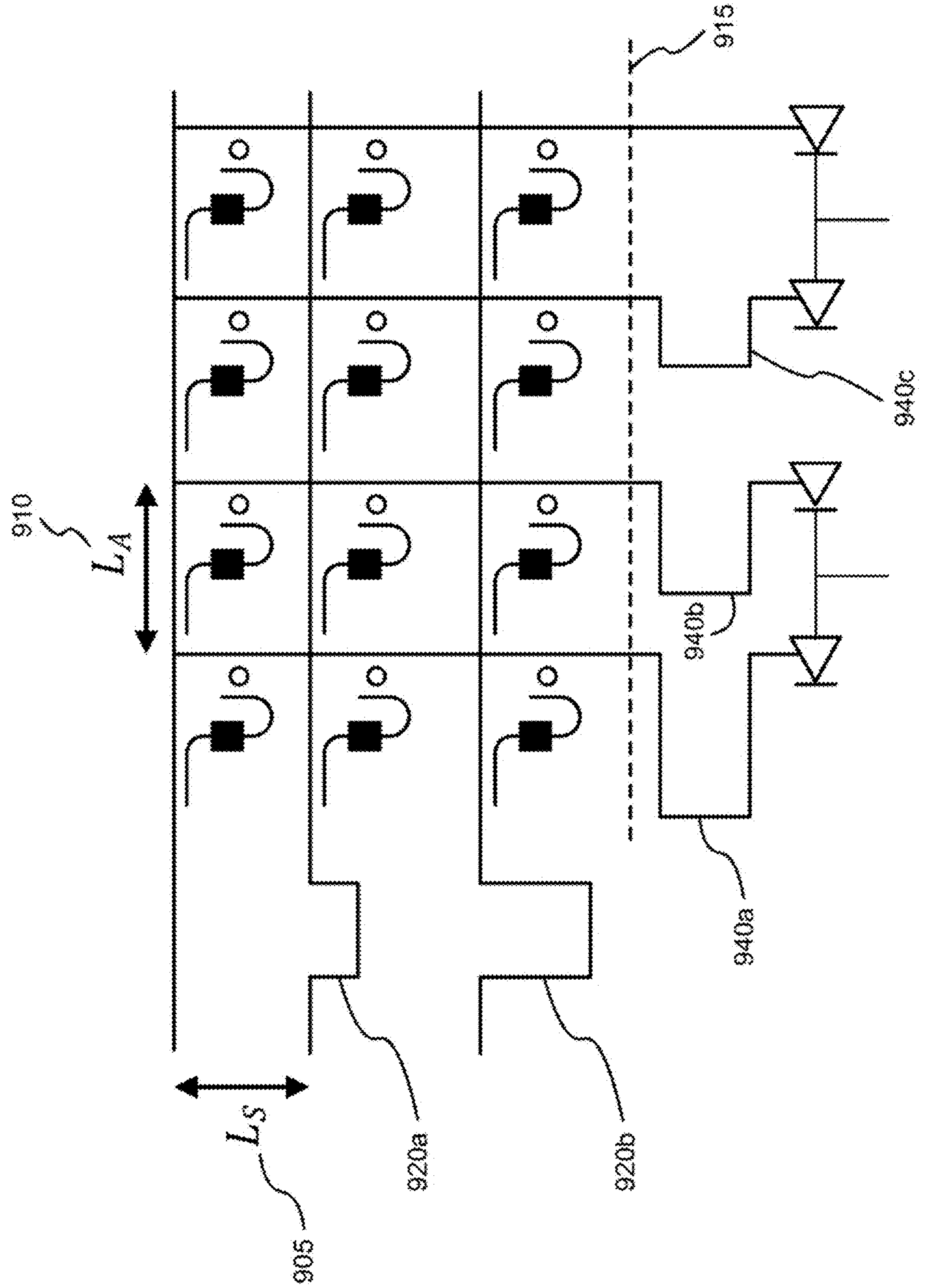
FIG. 9 illustrates a passive waveguide delay-line compensation scheme in accordance with an embodiment of the present disclosure.

FIG. 9 illustrates a passive waveguide delay-line compensation scheme in accordance with an embodiment of the present disclosure. The compensation scheme includes a set of input delay components 920*a*, 920*b* and a set of output delay components 940*a*, 940*b*, 940*c*. Each of the delay components 920*a*, 920*b*, 940*a*, 940*b*, 940*c* can be passive delay line components having a length-extended portion of an input optical waveguide or output optical waveguide to which the component is connected. In other words, each delay component can be implemented by varying the length or effective length of an input optical waveguide or output optical waveguide, relative to other input optical waveguides or output optical waveguides. The length variation is implemented in the portions of the input optical waveguides in the region between the light modulators and the photonic processing components. The length variation is implemented in the portions of the output optical waveguides in the region between the photonic processing components and the BPDs.

For example, with reference to FIG. 9, assume that the input and output waveguides are physically laid out in a rectangular grid, with $L_S$ 905 being the distance between adjacent rows of the grid and $L_A$ 910 being the distance between adjacent columns of the grid.

In the vertical (row-wise) direction, an optical signal provided into the $m^{th}$ row input optical waveguide will need to propagate within each of one or more optical output waveguides by a distance of $L_S\times(N-m+1)$ before it reaches location 915. Here, N is the number of rows in the crossbar array. Thus, different optical input signals can travel different distances, potentially leading to a loss of synchronization. To compensate for this, and to equalize the total propagation distance for each row (and thus synchronize the resulting optical input signal components within a given optical output signal), each optical input waveguide below the uppermost row is provided with an input delay component. The delay component in the $m^{th}$ row may be a waveguide of length $L_S\times(m-1)$, or a component providing an equivalent amount of delay. Thus, for example, the delay component 920*a* has length $L_S$ and the delay component 920*b* has length $2L_S$.

The effect of these input delay components is as follows. Each optical output signal can be viewed as including a plurality of sub-signals. Each sub-signal is representative of a different respective one of the input optical signals, and the output optical signal aggregates these sub-signals together by way of the different photonic processing components. The photonic apparatus thus includes a set of input delay components, each operatively coupled to a corresponding one of the input optical waveguides. The set of input delay components are collectively configured to cause synchronization between the plurality of sub-signals. This synchronization can be caused for example by the mechanism described with respect to FIG. 9.

In horizontal (column-wise) direction, as discussed above, four optical output signals are used together to represent a complex-weighted version of an aggregate of optical input signals. An optical signal input into a given input optical waveguide will need to propagate within that optical input waveguide by an additional distance of $L_A\times(r-1)$ before it reaches the $r^{th}$ optical output waveguide (via a photonic processing component), where r is between 1 and 4. To compensate for this, and to equalize the total propagation distance for each column (and thus synchronize the resulting optical output signals in these four optical output waveguides), each optical output waveguide to the left of the rightmost output waveguide is provided with an output delay component. The delay component in the $r^{th}$ column is a waveguide of length $L_A\times(4-r)$. Thus, for example, the delay component 940*a* has length $3L_A$, the delay component 940*b* has length $2L_A$, and the delay component 940*c* has length $L_A$.

The effect of these output delay components is as follows. A plurality of optical output signals (i.e. four optical output signals coupled to a same coupled pair of BPDs) collectively represent a complex-weighted output signal. The photonic apparatus includes a set of output delay components each operatively coupled to a corresponding one of the output optical waveguides. The set of output delay components are collectively configured to cause synchronization between said plurality of the optical output signals. This synchronization can be caused for example by the mechanism described above with respect to FIG. 9.

The above-described architecture can be used to match the phases between different crossbar weight elements for one antenna. For the antenna-level delay (X_RFN to X_RF1), there may still be a phase difference because of the physical waveguide length difference. To compensate for this, it may be required to pre-calibrate the system, and observe the real delay between each antenna (between 0 to 2π) to the first one (fastest). One can add another passive phase shifter or adjust the weight for I/Q for each antenna accordingly.

Physically, delay components can be implemented as waveguides of a predetermined length. The waveguides can be compactified by forming them as curved elements, spirals, space-filling curves, etc. External fibers can potentially be used. Other devices for delaying an optical signal by a particular amount can also be used, as would be readily understood by a worker skilled in the art.

Although only two input delay components and three output delay components are illustrated in FIG. 9, more or fewer delay components can be provided. For example, all but one of the input optical waveguides can be configured with a different input delay component in order to synchronize all sub-signals of each optical output signal. As another example, three out of every four output optical waveguides can be configured with a different output delay component in order to cause synchronization between the four output optical signals feeding into the same coupled pair of BPDs. Using output delay components to cause synchronization between different output optical signals feeding into different coupled pairs of BPDs may not be necessary. The structure of FIG. 9 can be used to provide the optical crossbar portion of a photonic apparatus as described elsewhere herein, for example with respect to FIGS. 1, 3 and 6.

Embodiments of the present disclosure provide for a (e.g. fully-connected) optical beamforming architecture using a crossbar array structure, including optical intensity adjustment and bandpass filtering. Such embodiments may be implemented using a complex Cartesian weighting approach for antenna array beamforming, with the complex weights implemented in the optical domain.

Embodiments of the present disclosure thus provide for a photonics-based beamforming architecture which leverages broadband absorption modulation for weighting and wavelength division multiplexing to couple the weighted input signals to an output waveguide.

According to various embodiments, signal combination may be realized by mixing photocurrents after simultaneous incoherent detection of all wavelength channels rather than coherent combining in the optical domain. Embodiments may involve RF phase shifting by complex weighting applied through a crossbar architecture containing a broadband attenuator and a passive bandpass filter. A tunable switch can replace the broadband attenuator within the crossbar unit. A simple passive waveguide delay-line compensation may be added into the crossbar system, which compensates the phase delay between different crossbar units within one antenna.

Optical components used in embodiments of the present disclosure can be embodied in photonic integrated circuits (optical chips) resulting in beamformers of small size, potentially low weight, low insertion loss, and with potentially low production and installation costs. The application of WDM to channelize the RF signals for parallel processing in crossbar units may facilitate a highly scalable and compact beamforming architecture that can be easily extended to support multiple data streams concurrently. Embodiments of the present disclosure may therefore be conducive to implementation in a hybrid beamforming system in comparison to existing optical beamforming technologies that employ true time delays in place of complex weighting to implement the RF phase shifts.

Embodiments of the present disclosure, providing an apparatus for (e.g. fully-connected) optical beamforming, can be applied to a variety of multi-user wireless communication systems with multiple (e.g. large numbers of) antennas at the transmitter, receiver, or both. This may provide a useful beamforming approach for current and future massive MIMO (mmWave) systems. Embodiments can potentially be efficiently scaled up to support many users and antennas. Electronics-based beamforming solutions are expected to face severe challenges in meeting the high data rate and very low latency requirements of future wireless networks as 5G/6G standards will likely evolve to support higher frequency bands in the mmWave spectrum and beyond. Embodiments of the present disclosure may be used to obviate or mitigate such challenges.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A photonic apparatus comprising:
- a plurality of input optical waveguides each configured to propagate a different respective optical input signal, each optical input signal residing in a different wavelength band;
- a plurality of output optical waveguides each configured to provide a respective optical output signal;
- a plurality of photonic processing components each comprising:
  - an input coupler configured to couple a portion of the optical input signal from one of the input optical waveguides and provide said portion at a coupler output port;
  - a controllable device configured to receive light from said coupler output port and provide a controllable fraction of said received light at a device output port; and
  - an output coupler configured to receive light from said device output port, filter said received light from said device output port to produce output light, and couple said output light onto one of the output optical waveguides to provide a portion of the optical output signal thereof;
- a plurality of balanced photodetectors each operatively coupled to a respective pair of the plurality of output optical waveguides and configured to produce an electrical output signal indicative of a difference between a pair of said optical output signals provided by said pair of the plurality of output optical waveguides;
- a plurality of antenna ports for coupling to a respective plurality of antennas of an antenna array;
- one or more electronic radiofrequency processing sections of an antenna array beamforming system; and a plurality of electrically controllable light modulators each configured to convert a respective electrical input signal into the respective optical input signal of a respective one of the input optical waveguides, wherein to provide a receiver configuration:
- each one of the plurality of antennas is operatively coupled to a respective one of the electrically controllable light modulators to cause the optical input signal of a respective one of the input optical waveguides to represent output of said one of the plurality of antennas;
- each one of the plurality of output optical waveguides is operatively coupled to multiple ones of the photonic processing components to receive and combine controllably weighted versions of multiple respective ones of the optical input signals therefrom in order to perform received antenna signal combining;
- each one of the electronic radiofrequency processing sections is configured to receive output from a respective pair of the plurality of balanced photodetectors and produce a respective one of one or more independent receive signals as concurrently received by the antenna array.

2. The photonic apparatus of claim 1, wherein each of the electronic radiofrequency processing sections is configured to perform a set of frequency downconversion and demodulation operations involving said outputs from the respective pair of the plurality of balanced photodetectors.

3. The photonic apparatus of claim 1, wherein the controllable devices of the photonic processing components are collectively configured, at least in part by setting of said controllable fraction, to cause at least one set of four of the optical output signals to collectively carry a complex-weighted representation of one or a multiplexed collection of the input optical signals.

4. The photonic apparatus of claim 3, wherein the complex-weighted representation is configured to implement analog operations of a beamforming precoder or combiner.

5. The photonic apparatus of claim 3, further comprising a controller operatively coupled to the controllable devices and configured to set said controllable fractions thereof.

6. The photonic apparatus of claim 1, wherein the controllable device is a controllable optical attenuator.

7. The photonic apparatus of claim 1, wherein:

the controllable device is configured to provide a second controllable fraction of said received light at a second device output port, the controllable fraction and the second controllable fraction formed at least in part by separating light from said coupler output port into two portions; and each of the plurality of photonic processing components further comprises a second output coupler configured to receive light from said second device output port, filter said received light from said second device output port to produce second output light, and couple said second output light onto another one of the output optical waveguides to provide a portion of the optical output signal thereof.

8. The photonic apparatus of claim 1, wherein each optical output signal comprises a plurality of sub-signals each representative of a different respective one of the input optical signals, the photonic apparatus further comprising a set of input delay components each operatively coupled to a corresponding one of the input optical waveguides, the set of input delay components collectively configured to cause synchronization between the plurality of sub-signals.

9. The photonic apparatus of claim 1, wherein a plurality of the optical output signals collectively represent a complex-weighted output signal, the photonic apparatus further comprising a set of output delay components each operatively coupled to a corresponding one of the output optical waveguides, the set of output delay components collectively configured to cause synchronization between said plurality of the optical output signals.

10. The photonic apparatus of claim 1, wherein the output coupler is configured to perform bandpass filtering of said received light, said bandpass filtering passing light having wavelengths at and around a center wavelength which matches with a center wavelength of the optical input signal propagated by the input optical waveguide to which the output coupler is operatively coupled.

11. A photonic apparatus comprising:

one or more input optical waveguides each configured to propagate a different respective optical input signal, each optical input signal residing in a different wavelength band;

a plurality of output optical waveguides each configured to provide a respective optical output signal;

a plurality of photonic processing components each comprising:

an input coupler configured to couple a portion of the optical input signal from one of the input optical waveguides and provide said portion at a coupler output port;

a controllable device configured to receive light from said coupler output port and provide a controllable fraction of said received light at a device output port; and an output coupler configured to receive light from said device output port, filter said received light from said device output port to produce output light, and couple said output light onto one of the output optical waveguides to provide at least a portion of the optical output signal thereof;

a plurality of balanced photodetectors each operatively coupled to a respective pair of the plurality of output optical waveguides and configured to produce an electrical output signal indicative of a difference between a pair of said optical output signals provided by said pair of the plurality of output optical waveguides;

a plurality of antenna ports for coupling to a respective plurality of antennas of an antenna array;

one or more electronic radiofrequency processing sections of an antenna array beamforming system; and a plurality of electrically controllable light modulators each configured to convert a respective electrical input signal into the respective optical input signal of a respective one of the input optical waveguides, wherein to provide a transmitter configuration:

each one of the electronic radiofrequency processing sections is configured to receive a respective one of one or more independent transmit signals for concurrent transmission by the antenna array and perform a radiofrequency mixing operation involving said one of the one or more independent transmit signals to generate a respective converted transmit signal, each one of the electronic radiofrequency processing sections being operatively coupled to a respective one of the electrically controllable light modulators to cause the optical input signal of a respective one of the input optical waveguides to represent said respective converted transmit signal;

each one of the plurality of output optical waveguides is operatively coupled to one or more the photonic processing components;

each one of the plurality of antennas is driven based a combined output from a respective pair of the plurality of balanced photodetectors.

12. The photonic apparatus of claim 11, wherein the one or more photonic processing components are a plurality of photonic processing components, and wherein each one of the plurality of output optical waveguides is operatively coupled to multiple ones of the plurality of photonic processing components to receive and combine controllably weighted versions of multiple respective ones of the optical input signals therefrom in order to perform transmit signal combining.

13. The photonic apparatus of claim 11, wherein the controllable devices of the photonic processing components are collectively configured, at least in part by setting of said controllable fraction, to cause at least one set of four of the optical output signals to collectively carry a complex-weighted representation of one or a multiplexed collection of the input optical signals.

14. The photonic apparatus of claim 13, wherein the complex-weighted representation is configured to implement analog operations of a beamforming precoder or combiner.

15. The photonic apparatus of claim 11, wherein the controllable device is a controllable optical attenuator.

16. The photonic apparatus of claim 11, wherein:

the controllable device is configured to provide a second controllable fraction of said received light at a second device output port, the controllable fraction and the second controllable fraction formed at least in part by separating light from said coupler output port into two portions; and each of the plurality of photonic processing components further comprises a second output coupler configured to receive light from said second device output port, filter said received light from said second device output port to produce second output light, and couple said second output light onto another one of the output optical waveguides to provide a portion of the optical output signal thereof.

17. The photonic apparatus of claim 11, wherein each optical output signal comprises a plurality of sub-signals each representative of a different respective one of the input optical signals, the photonic apparatus further comprising a set of input delay components each operatively coupled to a corresponding one of the input optical waveguides, the set of input delay components collectively configured to cause synchronization between the plurality of sub-signals.

18. The photonic apparatus of claim 11, wherein a plurality of the optical output signals collectively represent a complex-weighted output signal, the photonic apparatus further comprising a set of output delay components each operatively coupled to a corresponding one of the output optical waveguides, the set of output delay components collectively configured to cause synchronization between said plurality of the optical output signals.

19. The photonic apparatus of claim 11, wherein the output coupler is configured to perform bandpass filtering of said received light, said bandpass filtering passing light having wavelengths at and around a center wavelength which matches with a center wavelength of the optical input signal propagated by the input optical waveguide to which the output coupler is operatively coupled.

20. A method comprising:

propagating, by each of one or more input optical waveguides, a different respective optical input signal, each optical input signal residing in a different wavelength band;

providing, by each of a plurality of output optical waveguides, a respective optical output signal;

by a plurality of photonic processing components:

by an input coupler, coupling a portion of the optical input signal from one of the input optical waveguides and provide said portion at a coupler output port;

by a controllable device, receiving light from said coupler output port and providing a controllable fraction of said received light at a device output port; and by an output coupler, receiving light from said device output port, filtering said received light from said device output port to produce output light, and coupling said output light onto one of the output optical waveguides to provide at least a portion of the optical output signal thereof;

by a plurality of balanced photodetectors each operatively coupled to a respective pair of the plurality of output optical waveguides, producing an electrical output signal indicative of a difference between a pair of said optical output signals provided by said pair of the plurality of output optical waveguides;

by each of a plurality of electrically controllable light modulators, converting a respective electrical input signal into the respective optical input signal of a respective one of the input optical waveguides, wherein to provide a transmitter configuration:

each one of the electronic radiofrequency processing sections receives a respective one of one or more independent transmit signals for concurrent transmission by the antenna array and performs a radiofrequency mixing operation involving said one of the one or more independent transmit signals to generate a respective converted transmit signal, each one of the electronic radiofrequency processing sections causes, via operative coupling to a respective one of the electrically controllable light modulators, the optical input signal of a respective one of the input optical waveguides to represent said respective converted transmit signal;

each one of the plurality of output optical waveguides is operatively coupled to one or more the photonic processing components;

each one of the plurality of antennas is driven based a combined output from a respective pair of the plurality of balanced photodetectors.

* * * * *